T. M. CHANCE.
METHOD AND APPARATUS FOR WASHING COAL AND CONCENTRATING ORES AND MINERALS.
APPLICATION FILED AUG. 27, 1917.
1,392,399.
Patented Oct. 4, 1921.
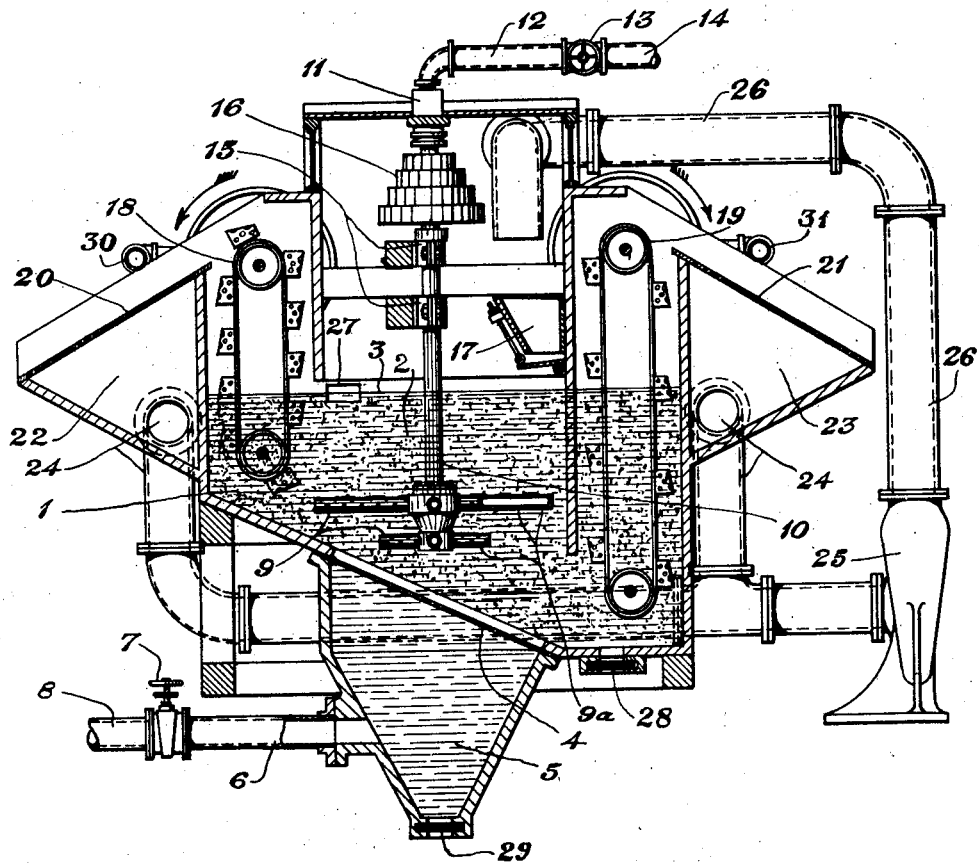
WITNESSES:
INVENTOR
Thomas M. Chance

UNITED STATES PATENT OFFICE.

THOMAS M. CHANCE, OF PHILADELPHIA, PENNSYLVANIA.

METHOD AND APPARATUS FOR WASHING COAL AND CONCENTRATING ORES AND MINERALS.

1,392,399.   Specification of Letters Patent.   Patented Oct. 4, 1921.

Application filed August 27, 1917. Serial No. 188,430.

*To all whom it may concern:*

Be it known that I, THOMAS M. CHANCE, a citizen of the United States, residing at Philadelphia, in the State of Pennsylvania, have invented certain new and useful Improvements in Methods and Apparatus for Washing Coal and Concentrating Ores and Minerals, whereof the following is a specification.

My invention relates to improvements adapted to be used in operating the method of washing coal and concentrating ores disclosed by me in United States Patent 1,224,138 dated May 1, 1917, wherein a fluid mass of relatively high specific gravity, consisting of a mixture of liquid and comminuted insoluble material heavier than the liquid and maintained in a fluidic condition by agitation, is used to separate materials of specific gravity relatively greater than that of said fluid mass from those of specific gravity equal to or relatively less than that of said fluid mass, and consists in improvements whereby the fluid mass may be used in connection with a body of liquid of less specific gravity superimposed thereon.

For simplicity the word "water" will be used to mean any liquid suitable for the purpose, and the word "sand" will be used to mean any granular insoluble material heavier than the liquid and which will sink readily in said liquid unless maintained suspended in said liquid by agitation.

I have found, as disclosed in said patent, that agitation suitable for the purpose of maintaining the fluid mass can be produced either by energy applied mechanically, (as by stirring arms, etc.) or by energy supplied by liquid under pressure. It is evident that the energy theoretically required will be the same whether applied mechanically or by the introduction of liquid under pressure, but it is also evident that the energy actually required will depend upon the way in which it is applied, because much of the energy applied to effect agitation may be expended in friction and thus become dissipated as heat and have no useful effect in producing the agitation necessary to overcome, or to neutralize, the tendency of the individual particles of the solid matter to settle by gravity.

It is evident that if I use fixed quantities of sand and water as the constituents of such a fluid mass, and mechanically apply agitation sufficient to keep the sand and water thoroughly mixed, the fluid mass will have a definite and fixed specific gravity which is fixed by the relative proportions of sand and water used; but if agitation is applied to such mixture by the introduction of liquid under pressure,—hereinafter for convenience called "hydraulic water," the predetermined relations between the proportions of sand and water are disturbed or destroyed, and the control of the specific gravity and volume of the fluid mass to conform to any predetermined required conditions must be accomplished by regulating the use of the hydraulic water to such quantity and to such head or pressure as will secure the desired result.

The most simple and obvious way in which to apply hydraulic water to effect agitation is to introduce it from below (as through a perforate bottom) as an upwardly rising current, or as a series of isolated jets. In effecting agitation in this way, if a given quantity of sand be used, a fluid mass of definite specific gravity is formed and maintained by a definite volume of hydraulic water introduced per unit of time under a definite head or pressure. If the volume of hydraulic water be increased the grains of sand are more forcibly agitated and are forced farther apart and the specific gravity of the fluid mass is correspondingly decreased and the volume of the fluid mass is correspondingly increased,—and vice versa. I have found that agitation giving similar results can be produced by jets of hydraulic water introduced in any desired direction and at any desired height above the bottom of the fluid mass. Such jets may be made to issue from orifices in pipes located in the body of the fluid mass and may be discharged in a vertically downward direction, or at any desired angle, and may be made to produce the agitation necessary to maintain the fluid mass at the desired specific gravity and of the desired volume. When agitation is effected by energy partly applied mechanically and partly applied by means of hydraulic water, the quantity of hydraulic water required to maintain the fluid mass at a certain specific gravity and volume steadily diminishes as the mechanical agitation is increased.

If means be provided for the accurate and definite control of the degree of agitation, that is, if the agitation be uniform and constant, so that a fluid mass of definite and practically constant specific gravity and volume is produced and maintained, I find it is possible to superimpose upon said fluid mass a body of water (liquid) of any desired depth, and that such superimposed water will "float" upon said fluid mass. In practice the line of demarcation between the fluid mass and the body of water "floating" upon it as above described is almost as clearly defined as the line separating water from a body of oil which is floating upon it. Such a body of water (liquid) superimposed upon the fluid mass can advantageously be used to wash off from separated materials being removed from said fluid mass, the particles of sand that are mixed with said materials, that is to say, this superincumbent water may be used in place as wash water, the sand thus washed from the said materials immediately sinking through the water to become reincorporated as a part of the fluid mass.

This superincumbent water may be advantageously used to remove from the materials to be washed or concentrated, prior to their introduction into the fluid mass for separation, substances such as mud, slimes, dirt and the like, as well as materials lighter than water such as wood, rope, yarn, cotton, cloth, burlap, paper, etc., that may be mixed with the ore, coal or other material that is to be washed or concentrated by introduction into the said fluid mass; and also to effect the separation of such substances and material after the materials to be washed or concentrated by introduction into the fluid mass have been introduced into said mass.

Apparatus in which my invention may be carried out is diagrammatically illustrated by the figure of the drawing, which is a central vertical cross-section in which 1 is a receptacle, conventionally shown as a tank, adapted to contain an agitated mass, consisting of a mixture of liquid and comminuted insoluble solid matter heavier than said liquid and maintained by agitation as a fluid mass of relatively high specific gravity, and a body of liquid superimposed upon said fluid mass. The upper surface of said fluid mass is indicated by the dot and dash line 2 and that of said body of liquid by the dot and dash line 3. The fluid mass occupying the space below the line 3 is diagrammatically indicated by parallel broken lines to represent liquid and stippled to indicate the solid constituent (sand) of said fluid mass; the superimposed liquid (water) occupying the space between lines 2 and 3 is indicated by broken parallel lines. The apparatus embodies three means for mantaining agitation of the fluid mass 2, namely, by means of the perforate bottom 4 through which from the chamber 5 liquid under pressure may flow upward through the perforations in said bottom 4 into said fluid mass 2, said liquid being supplied, through pipe 6 and regulating and cut-off valve 7, from the pipe 8, which is to be connected to any suitable source of supply of liquid under pressure; also by means of the perforate pipes or arms 9, provided with perforations (holes) 9ª adapted to distribute jets of liquid in any desired direction,—vertically downward, upward or at any intermediate angle,—the pipes or arms 9 being in communication, through the hollow shaft or pipe 10, the stuffing box 11, the pipe or conduit 12 and the regulating and cut-off valve 13, with the pipe 14, which is to be connected to any suitable source of supply of liquid under pressure; also by means of mechanical rotation of the arms 9 by the hollow shaft 10, said shaft 10 being supported by bearings 15, and being driven by power transmitted from any suitable source of energy by means of the change-speed gear 16, conventionally shown as a compound step pulley.

The apparatus also illustrates means for introducing the materials to be separated, diagrammatically shown as automatic feeder 17, means for removing relatively light separated materials, conventionally shown as an elevator 18, and means for removing heavy separated materials, shown diagrammatically as an elevator 19, means for dewatering said products, and for removing parts of the fluid mass adhering to said products, shown as screens 20 and 21, and means for returning the parts so removed to said fluid mass, shown diagrammatically by the pockets 22, 23, openings and conduits 24, elevating device 25, shown as a centrifugal pump, and conduit 26. An overflow for excess liquid is shown at 27 and spigots for flushing tank 1 and chamber 5 are indicated by the numerals 28 and 29. Wash water may be applied to remove portions of the fluid mass adhering to the material passing over screens 20 and 21 by the spray pipes 30 and 31, it being understood that said pipes are connected to a suitable source of liquid supply.

It will of course be clear that any desired number of arms 9 may be employed and that such perforations 9ª as are not required may be closed with plugs.

From the foregoing description it is evident that the apparatus may be operated without applying power to rotate the shaft 10, agitation of the fluid mass being effected by liquid under pressure issuing from the perforations of either the arms 9 or of the perforate bottom 4, or by liquid issuing from the perforations in both 9 and 4; it is also evident that agitation may be effected by rotation of the shaft 10 and arms 9 without the assistance of liquid under pressure or with the assistance of liquid issuing from the perforations in 9, or in 4, or in both.

These different modes of operation are rendered easy of variation and of adjustment because the valves 7 and 13 can both be used either to regulate the volume of flow and the pressure of liquid at the perforations in 4 and 9 or to cut it off altogether, and the change-speed gear 16 can be used to regulate the degree of agitation produced by movement of the arms 9.

The elevators 18 and 19, for removing the separated materials from the body of the fluid mass, are diagrammatically shown as bucket elevators, but it will be understood that any desired form of elevating device may be used for performing the functions of these elements of the apparatus. If bucket elevators or flight conveyers are used for this purpose, the buckets or flights would preferably be of the perforated type employed in dewatering elevators and conveyers.

It will be understood that in constructing apparatus for the use of my invention I do not confine myself to the particular form or style used in the drawings to illustrate the application of my method, as it is evident that in constructing such apparatus a great variety of appliances in common use for handling solids and for handling liquids may advantageously be employed for like purposes in carrying out by invention.

In U. S. Patent 1,224,138, hereinbefore referred to, a number of modifications of apparatus for employing mechanical, hydraulic and pneumatic agitation are shown and described, together with various appliances for feeding the materials to be separated into the fluid mass, removing the separated materials from said fluid mass and recovering the portions of said fluid mass mixed with said materials after such removal. It will be understood that such modifications as may be applicable to my present invention may be employed by any skilled in the art, the apparatus necessary to the employment of my invention comprising the following elements:—a receptacle adapted to contain a fluid mass, said mass consisting of an agitated mixture of comminuted solid material and liquid, a body of liquid superimposed upon said fluid mass, means for agitating said fluid mass, means for introducing the materials to be separated therein, and means for the removal of the separated materials therefrom after separation has been accomplished. It will be understood by any skilled in the art that if a weir discharge for the separated material of low specific gravity be employed, as shown in Figs. III and IV of said Patent No. 1,224,138, that said weir must be so restricted as to discharge, as to establish a body of liquid of considerable depth superimposed upon the fluid mass. With such type of construction the separated material of low specific gravity flows over the weir and is transported through the overflow of said body of liquid, said transportation being due to the difference between the trajectory of said separated material and of the liquid.

From the foregoing description the operation of the apparatus shown by the figure of the drawing is sufficiently simple. The fluidic properties of the fluid mass contained in tank 1 below the level of the line 2 are maintained by agitation produced by hydraulic water introduced through perforate bottom 4 or hollow arms 9, or by mechanical agitation produced by the rotation of said arms 9, or by the combined use of any two or all three of these agitating means. The volume of the fluid mass and the agitation thereof are so proportioned as to permit a body of liquid to be retained upon the upper surface of said fluid mass and said body of liquid will occupy a space such as that included between the lines 2 and 3 in the drawing. The materials to be separated are introduced through feeding device 17, the material of specific gravity approximating, or less than, that of the fluid mass rises to the upper portion thereof and is removed by elevator 18, while that of greater density than said fluid mass falls to the lower portion thereof and is removed by elevator 19. The separated materials are transported by elevators 18 and 19 through the body of liquid between lines 2 and 3 and portions of the fluid mass that are mixed with said separated materials are washed from said materials and fall back through the perforated elevator buckets into the fluid mass below line 2. The separated materials are further cleaned of any adhering parts of the fluid mass, and are also dewatered, by passing over screens 20 and 21, with or without the assistance of wash water from pipes 30 and 31 and the portions of said fluid mass and the water so removed are returned to tank 1 by centrifugal pump 25 and conduit 26, said return passing through feeder 17 if so desired.

The light material having a specific gravity equal to, or less than, that of water, such as wood-chips, cotton waste, etc., will float in the body of liquid between the lines 2 and 3 and may be removed through liquid overflow 27.

It will of course be understood that the location of the top surface of the fluid mass, indicated by dot and dash line 2 in the drawing Fig. 1, and also that of the top of the body of liquid, indicated by line 3 in said drawing, may be varied to meet the requirements of the particular separation to be made and are not to be considered as fixed at the points shown in said drawing.

In an application for patent filed simultaneously on Aug. 27, 1917, with this present application, the serial number of which said application is 188,431, for Method and apparatus for washing coal and concentrating ores, I have shown and described the use of a body of liquid superimposed upon a fluid mass of the character herein described, but which fluid mass is, in the application referred to, superimposed upon one or more fluid masses of greater specific gravity, the combination of fluid masses therein described being termed a "compound fluid mass," and I therefore have limited the claims of said application to the use of a body of liquid superimposed upon a compound fluid mass or masses, and to the use of a compound fluid mass, or plurality of superimposed fluid masses, as therein described, whereas in this application I broadly claim the use of a body of liquid superimposed upon a fluid mass, whereby it becomes possible to make a four-part separation, viz: the separation of material lighter than the superimposed liquid, the separation of materials lighter than the fluid mass, the separation of materials heavier than the fluid mass and the separation of particles of the solid material composing the fluid mass from the materials separated by the action of said fluid mass. The separation of such solid materials of the fluid mass is facilitated by a difference in the operation of this improved method over that of the method of said Patent No. 1,224,138, and also by the opportunity of washing off such adhering particles more or less completely prior to the removal of the separated materials from the tank or receptacle containing the fluid mass.
As the physical properties of a fluid mass such as is above described are similar to those of a high gravity liquid, it will be understood that the fluid mass will run freely (like a liquid) through the perforations of a perforate bucket, so that upon entering the liquid zone overlying the fluid mass, the buckets will contain only small portions of the fluid mass mixed with the material to be separated, and most of this will readily be washed out by the currents and agitation caused by drawing the buckets up through the liquid overlying the fluid mass. So long as the buckets are submerged there is no tendency of the solid particles of which the fluid mass consists, to adhere to the materials to be separated, but on the contrary these particles freely roll down over inclined surfaces of the materials to be separated, and are kept in motion in the liquid by very slight currents in the liquid, or by a very slight jarring or shaking or even by a slight vibration of the elevator buckets such as is always present in the operation of elevators or conveyers. When, however, the materials are lifted out into the air, then unseparated solid particles of the fluid mass do tend to adhere to the materials with which they are in contact and must forcibly be removed by spraying or other means as described above.

A further advantage secured by use of this body of liquid is its action as a shield to prevent the escape or loss of solid particles of the fluid mass with the overflow from the apparatus. This body of liquid being relatively quiescent will permit the particles of solid matter of the fluid mass that are washed from separated materials being removed from the apparatus to sink or fall through said body of liquid and thus rejoin the fluid mass. The body of liquid thus acts as a barrier or shield to prevent the escape of the solid constituent of the fluid mass, but this result will not be achieved nor will the submergence of material floating in the fluid mass be appreciably reduced nor can the body of liquid be successively used to wash from the separated materials being removed the solid constituent of said fluid mass that may be mixed with said materials if said body of liquid be a mere film or layer of relatively very small depth, and this is especially true when operating my method with hydraulic agitation, because the surface current velocity of a thin layer of liquid flowing toward the overflow will be relatively rapid and prevent complete settlement of the solid matter of the fluid mass. For these reasons I have designated this "layer" of liquid as a "body of liquid" meaning thereby to convey the idea of a layer of substantial depth and I have also made the drawing to convey the same idea. I do not, however, desire to limit myself to the use of any definite depth to such body of liquid, as the depth of such body of liquid may be varied to suit the varying conditions of practice without departing from the spirit of my invention.

By the superposition of such a body of liquid upon a fluid mass there is provided not only a washing and conveying element for the return of the comminuted solid constituent of the fluid mass, but in addition thereto; a means is supplied for decreasing the submergence of the separated material of low specific gravity floating in the fluid mass. It will be obvious that coal immersed in a fluid mass of greater density than said coal will ride out of said mass until the unsupported weight of coal projecting into the air is equal to the excess buoyancy of the coal submerged, e. g. if the coal be of 1.30 density and fluid mass of 1.60 density about 18.75 per cent. of coal will extend above the fluid mass and about 81.25 per cent. will be submerged therein. Under such conditions, if the total voids between the various pieces of coal floating in the fluid mass equal 50 per cent. of the total volume occupied by the coal, then a volume of fluid mass equal to

.50×81.25% or 40.625% of the coal volume, must be removed with the coal if a solid bucket elevator be used. On the other hand, if my present invention be employed and a contacting body of liquid of the same specific gravity as that of the liquid constituent of the fluid mass be superimposed upon said fluid mass, then it is equally obvious that the 1.30 density coal will ride much farther out of the fluid mass, the submergence being reduced from 81.25 per cent. to but 50 per cent. if said body of liquid be water with a density of 1. Assuming the same 50% voids in the coal the maximum quantity of fluid mass that can be entrapped with the coal volume. but .50×50%, or 25%, of the coal volume. It is clear that this second function of the supernatant body of liquid in decreasing the submergence of the separated material floating in the fluid mass is of great importance since it reduces the work necessary to be done in removing the admixed fluid mass from the lighter separated materials.

By the term "fluid mass" as used in the claims hereof I mean to include any mixture of comminuted solids and liquid which when properly agitated will approach the properties and fluidity of a true liquid but that requires continuous agitation to preserve such fluidic properties.

Having described my invention I claim:

1. A method of separating materials of different specific gravities which consists in subjecting said materials to the separating action of a fluid mass consisting of an agitated mixture of liquid and comminuted insoluble solid material heavier than the liquid; in permitting material of relatively low specific gravity to rise to and float in the upper portion of said fluid mass; in permitting the material of relatively high specific gravity to sink to the lower portion of said fluid mass; in removing the materials thus separated from said fluid mass; in transporting the material of high specific gravity thus removed through a body of liquid superimposed upon said fluid mass, said liquid being of a specific gravity not greater than that of the liquid constituent of said fluid mass, in causing the contact of said body of liquid with said separated materials to remove a portion of the comminuted solid matter of said fluid mass from said materials; and in permitting the action of said body of liquid to assist the return of said solid matter to said fluid mass, whereby comminuted solid matter of said fluid mass mixed with said separated material is washed therefrom.

2. A method of separating materials of different specific gravities which consists in subjecting said materials to the separating action of a fluid mass consisting of an agitated mixture of liquid and comminuted insoluble solid material heavier than the liquid; in permitting material of relatively low specfic gravity to rise to and float in the upper portion of said fluid mass; in permitting the material of relatively high specific gravity to sink to the lower portion of said fluid mass; in removing the materials thus separated from said fluid mass; in transporting the materials thus removed through a body of liquid superimposed upon said fluid mass, said liquid being of a specific gravity not greater than that of the liquid constituent of said fluid mass, in causing the contact of said body of liquid with said separated materials to remove a portion of the comminuted solid matter of said fluid mass from said materials; and in permitting the action of said body of liquid to assist the return of said solid matter to said fluid mass; whereby comminuted solid matter of said fluid mass mixed with said separated materials is washed therefrom.

3. A method of washing coal which consists in feeding said coal into an agitated mixture of sand and water composing a fluid mass of relatively high specific gravity; permitting the coal of relatively low specific gravity to rise to and float in the upper portion of said mass; permitting the impurities of relatively high specific gravity to sink to the lower portion of said fluid mass; removing the coal and impurities thus separated from said fluid mass; in transporting the coal thus removed through a body of liquid superimposed upon said fluid mass; said liquid being of a specific gravity not greater than that of the liquid constituent of said fluid mass, in causing the contact of said body of liquid with said separated coal to remove a portion of the sand from said coal; and in permitting the action of said body of liquid to assist the return of said sand to said fluid mass; whereby comminuted solid matter of said fluid mass mixed with said separated coal is washed therefrom.

4. A method of washing coal which consists in feeding said coal into an agitated mixture of sand and water composing a fluid mass of relatively high specific gravity; permitting the coal of relatively low specific gravity to rise to and float in the upper portion of said mass; permitting the impurities of relatively high specific gravity to sink to the lower portion of said fluid mass; removing the coal and impurities thus separated from said fluid mass; in transporting the coal and impurities thus removed through a body of liquid superimposed upon said fluid mass; said liquid being of a specific gravity not greater than that of the liquid constituent of said fluid mass, in causing the contact of said body of liquid with said separated coal and impurities to remove a portion of the sand from said coal; and in permitting the action of said body of liquid to assist the return of said sand to said fluid mass, whereby comminuted solid matter of said fluid mass mixed with said separated coal and impurities is washed therefrom.

5. A method of separating materials of different specific gravities which consists in subjecting said materials to the separating action of a fluid mass consisting of a maintained suspension of insoluble matter and liquid, said solid matter being of greater specific gravity than said liquid, said fluid mass having a body of liquid of a specific gravity not greater than that of the liquid constituent of said fluid mass superimposed upon it; in causing the materials lighter than the liquid to float in said liquid; in causing the materials lighter than said fluid mass to float in said fluid mass; in causing the materials heavier than said fluid mass to sink in said fluid mass; in transporting material thus separated by said fluid mass through said body of liquid; in causing the contact of said body of liquid with said separated materials to remove a portion of the comminuted solid matter of said fluid mass from said material; and in causing the action of said body of liquid to assist the return of said solid matter to said fluid mass.

6. A method of separating materials of different specific gravities which consists in subjecting said materials to the separating action of a fluid mass of relatively high specific gravity consisting of a maintained suspension of insoluble solid matter and liquid, said solid matter being heavier than the liquid; in causing material of relatively low specific gravity to rise to and float in the upper portion of said fluid mass; in causing the material of relatively high specific gravity to sink to the lower portion of said fluid mass; in removing the materials thus separated from said fluid mass; in transporting the material of low specific gravity thus removed through a body of liquid superimposed upon said fluid mass, said liquid being of specific gravity not greater than the liquid constituent of said fluid mass; in causing the contact of said body of liquid with said separated materials to remove a portion of the comminuted solid matter of said fluid mass from said material; and in causing the action of said body of liquid to assist the return of said solid matter to said fluid mass; whereby comminuted solid matter of said fluid mass mixed with said separated material is washed therefrom.

7. A method of separating materials of different specific gravities which consist in maintaining appreciably coarse granular material suspended in liquid, and forming thereby a fluid mass of relatively high specific gravity; maintaining a body of said liquid superimposed thereon; introducing said materials into said fluid mass; causing said materials to separate in said fluid mass; causing the separated material of relatively low specific gravity to rise to the top of said fluid mass and float in contact with said superimposed body of liquid, whereby the submergence of said material in said fluid mass is decreased and a portion of the fluid mass filling the interstitial volume of said material is replaced by said liquid; removing the materials so separated from said fluid mass; and removing the material contacting with said body of liquid from said liquid.

8. A method of washing coal which consists in feeding said coal into a suspension of sand in water, composing a fluid mass of relatively high specific gravity; maintaining a body of water superimposed upon said fluid mass; causing the impurities of relatively high specific gravity to sink to the lower portion of said fluid mass; causing the coal to rise to the upper portion of said fluid mass and float in contact with said superimposed body of water, and thereby decreasing the submergence of said coal in said fluid mass and replacing a portion of the fluid mass filling the interstitial volume of said coal by said water; and removing the coal and impurities thus separated from said fluid mass.

9. An apparatus for the separation of materials of different specific gravity comprising in combination, a receptacle adapted to contain a fluid mass consisting of an agitated mixture of appreciably coarse granular material and liquid; a fluid mass consisting of said mixture in said receptacle; means for maintaining by agitation the fluidic properties of said fluid mass, whereby the separation is effected by differences in specific gravity and not by the classifying action of a current of liquid; means for introducing into said fluid mass the materials to be separated; means for removing said materials, after separation has been effected, from said fluid mass; and means for maintaining a body of liquid superimposed upon said fluid mass, said body of liquid constituting a washing and conveying element for the return to said fluid mass of portions of the solid constituent of said mass admixed with said separated materials.

10. An apparatus for the separation of materials of different specific gravity comprising in combination, a receptacle adapted to contain a fluid mass consisting of an agitated mixture of appreciably coarse granular material and liquid; a fluid mass consisting of said mixture in said receptacle; means for maintaining by agitation the fluidic properties of said fluid mass, whereby the separation is effected by differences in specific gravity and not by the classifying action of a current of liquid; means for introducing into said fluid mass the materials to be separated; means for removing said materials, after separation has been effected, from said fluid mass; means for separating said materials so removed from portions of said fluid mass adhering thereto; and means for maintaining a body of liquid superimposed upon said fluid mass, said body of liquid constituting a washing and conveying element for the return to said fluid mass of portions of the solid constituent of said mass admixed with said separated materials.

In testimony whereof I have hereunto signed my name at Philadelphia, Pennsylvania, this 24th day of August, 1917.

THOMAS M. CHANCE.

Witnesses:
E. R. BARNARD,
J. H. QUINN.